Nov. 17, 1970 — F. R. ABBOT — 3,541,476
MAGNETOSTRICTIVE DELAY LINE COMPRISED OF ADHESIVELY JOINED LAMINATIONS
Filed Aug. 16, 1968

INVENTOR.
FRANK R. ABBOTT
BY
ATTORNEYS 3,541,476
MAGNETOSTRICTIVE DELAY LINE COMPRISED
OF ADHESIVELY JOINED LAMINATIONS
Frank R. Abbot, San Diego, Calif., assignor to the United
States of America as represented by the Secretary of
the Navy
Filed Aug. 16, 1968, Ser. No. 753,261
Int. Cl. H03h 9/30
U.S. Cl. 333—30                                    6 Claims

ABSTRACT OF THE DISCLOSURE

The delay line, here, comprises a rectangular, laminated rod which is made up of ribbons of magneostrictive metal, adhesively bonded together. Magnetic pulses are fed into the rod at one point, and are sensed at another, by horseshoe magnetic yokes with pole-faces against the edges of the laminae of the rod. There is a close and efficient coupling of energy from the horseshoes to effect low eddy current losses.

The invention described, herein may be manufactured and used by or for the Government of the United States of America for governmental purposes without the payment of any royalties thereon or therefor.

BACKGROUND OF THE INVENTION

The property of some metals and alloys of metals to change dimensions in response to a magnetic field, called magnetostriction, is employed in acoustic delay lines. A magnetic pulse applied at one point on a magnetostrictive rod starts an acoustic wave along the rod. At a later time the acoustic wave arrives at a distant point on the rod, where the wave can be detected by a magnetic pickup sensor.

The usefulness of such a delay line seems to be limited, in part, by the distance such an acoustic wave can be transmitted along the rod. It is important that maximum energy be fed into the magnetic pulse, and hence, into the acoustic wave which is to be generated in the rod.

The object of this invention is to provide an improved acoustic delay line.

A more specific object of this invention is to provide an acoustic delay line in which maximum energy is fed into the magnetostrictive rod.

The objects of this invention are attained by increasing the coefficient of coupling between the magnetostrictive rod and the signal source, and by laminating the rod to minimize eddy current and other magnetic losses.

Other objects and features of this invention will become apparent to those skilled in the art by referring to the preferred embodiment described in the following specification and shown in the accompanying drawing in which.

Figure 1:
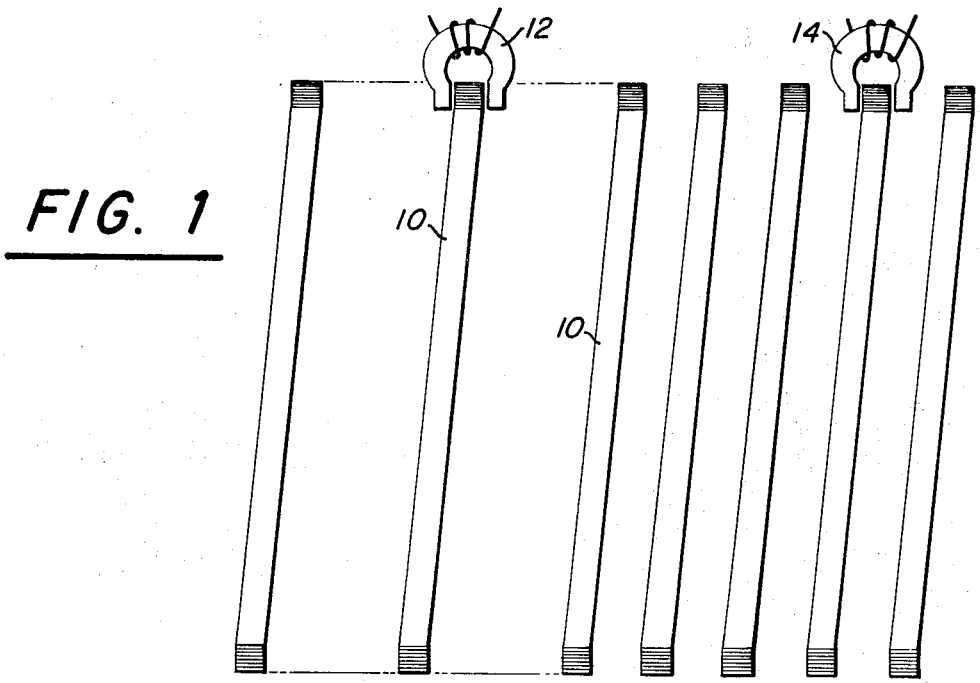
FIG. 1 is a half-section of a coiled rod of magnetostrictive material embodying this invention.

The more common magnetostrictive materials commercially obtainable is the nickel-iron alloys. It is immaterial in this invention whether positive or negative coefficients of magnetostriction is employed. In FIG. 1 the magnetostriction material is obtained in narrow ribbon form and is wound in successive convolutions upon a cylindrical form to build up a coiled rod, rectangular in cross-section. The layers of the ribbon are adhesively joined and baked or otherwise processed to stiffen the turns. Support structure for the turns of the coil can be provided although the coil can be made quite stiff with the laminating technique memtioned. Two transducer elements 12 and 14 are shown disposed at spaced points along the rod. One element feeds a pulse of strong magnetic energy into the edge of the laminae and the other receives the energy and couples out an electrical pulse. The velocity of propagation of acoustic energy along the rod and the linear distance along the rod between the two transducer elements determine the delay time between the input and output pulses.

Figure 2:
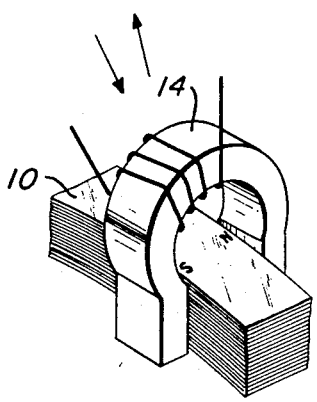
FIG. 2 is an enlarged perspective view, partly in section, of one transducer element adapted to the coiled delay line rod of FIG. 1.

The particular transducers shown in FIGS. 1 and 2 are of the elementary magnetic yoke horseshoe type with pole-faces disposed opposite the edges of the laminae of the rod 10. Preferably, the side edges of the laminae in the rod and the pole-faces of the magnet 14 are smoothed as by grinding so that a slight tension in the magnetic loop of 14 can press the pole-faces into firm metallic contact with the edges of the magnetostrictive rod. In the absence of air gaps in the magnetic circuit, nearly all of the energy fed into the input transducer serves to magnetize the rod in the region immediately between the pole-faces. The sudden change in volume of the coil between the pole-faces initiates an acoustical wave which travels in both directions from the region of the pole-faces. It will be apparent, now, that the boundaries of the magnetized region are quite distinct because of the close coupling of the metallic pole-faces to the rod. It follows that a steep wave front in the electrical wave will produce a steep wave front in the acoustic wave. The ends of the magnetostrictive rod may be tapered, if desired, to minimize reflections of the acoustic wave from the ends. The "Q" of the laminated rod can be increased by employed adhesives which cure quite hard. Glass materials, generally, are harder than plastics.

Figure 3:
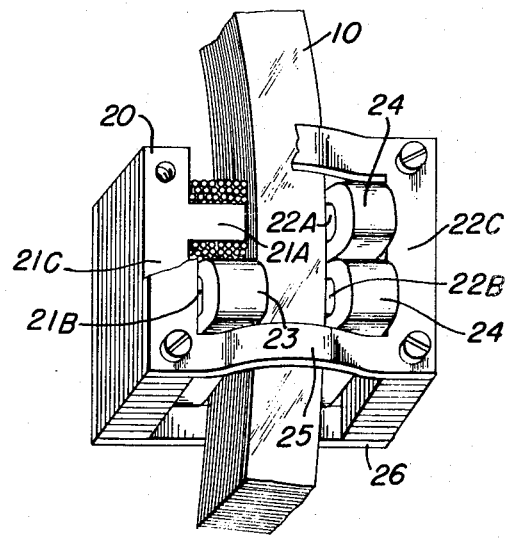
FIG. 3 is a perspective view of an alternative transmitting and/or receiving magnetic sensing element.

FIG. 3 shows an alternative transducer element for either feeding signal energy into, or sensing energy in the magnetostrictive rod. In FIG. 2, the north and south poles of the magnetic signal would necessarily occur at opposite sides of the rod 10, but in the transducer of FIG. 3, placement of the magnetic poles is more flexible. In FIG. 3, two pars of poles, on the opposite sides of the delay line 10, are provided. The magnetic circuit of the yoke on one side comprises the parallel legs 21A and 21B and the transverse section 21C. Sheet metal stampings for such a horseshoe or U-shaped core are easily fabricated by selecting dies of the desired shape. A corresponding core with parts 22A, 22B, and 22C are provided on the opposite side of the rod. The pole-faces at the ends of legs 22A, 22B, 21A, and 21B are preferably machined smooth to make good contact with the side edges of the laminae of the rod 10. Each leg preferably is provided with separate coils 23 or 24. The lead wires for the four coils can easily be connected in series or parallel aiding so as to provide two north and two south pole-faces in any desired combination. Rectangular frames 25 and 26, respectively, at opposite ends of the two cores are provided for compliantly holding the cores against the sides of the rod. Transverse arms of the frames can be bent as shown, if desired, to provide springiness and yieldable pressure contact between the pole-faces and the edges of the laminae of the rod. Conveniently, the stampings may be provided with extensions, as shown, which can be drilled and threaded to receive cap screws for attaching the frames 25 and 26 to the core members.

In operation, pulses with steep wave fronts can be applied to the signal circuits of the transducers and distinct shock waves can be started along the rods with a minimum eddy current and other losses in the magnetic signal circuits.

Obviously many modifications and variations of the present invention are possible in the light of the above teachings. It is, therefore, to be understood that within the scope of the appended claims the invention may be practiced otherwise than as specifically described.

What is claimed is:
1. An acoustic delay line comprising:
   a rod of magnetostrictive material, the rod being rectangular in cross-section,
   said rod being fabricated of ribbons of said magnetostrictive material, said ribbons being of uniform width and each being laid on the next and adhesively joined to form said rectangular cross-section,
   a first magnetic yoke with flat pole-faces abutting in good extended-area contact the edges of said ribbon exposed on opposite sides of said rod and coupled to a signal source for initiating an acoustic wave in said rod;
   a second magnetic yoke with pole-faces abutting the edges of said ribbons on the side of said rod at a point displaced along said rod for detecting said acoustic wave at a later selected time, and
   an output signal circuit coupled to second yoke.
2. In the acoustic delay line defined in claim 1, said ribbons being laid down and adhesively joined on a cylindrical form to fix helical turns of the delay line in a coil of predetermined dimensions.
3. In the acoustic delay line defined in claim 1, the pole faces of said yokes being yieldably pressed against the side edges of the ribbons of said rod to closely magnetically couple the yokes and rod and to minimize magnetic losses in the rod.
4. In the acoustic delay line defined in claim 1, each of said yokes comprising a horseshoe-shaped core for straddling said rod and with opposed pole-faces for bearing against the edges of said ribbon on opposite sides of said rod.
5. In the acoustic delay line defined in claim 1, each of said yokes comprising a horseshoe-shaped core with pole-faces at the ends of legs of the core and in a common plane for pressing against the ribbon edges on one side of said rod, and
   a coil on each of said legs.
6. In the acoustic delay line defined in claim 1, further comprising
   a third and a fourth yoke opposite, respectively, said first and second yokes,
   coils on all legs of the yokes, the coils being connected to establish a predetermined array of north and south magnetic poles at the pole-faces.

References Cited
UNITED STATES PATENTS 2,629,827   2/1953   Eckert et al. _____ 333—30 X
3,020,416   2/1962   Van Vechten et al.

PAUL L. GENSLER, Primary Examiner